United States Patent
Washecka

[19]

[11] Patent Number: 6,079,141
[45] Date of Patent: Jun. 27, 2000

[54] TAIL HOOK A DEVICE FOR FORMING A SLIDABLE LOOP AROUND AN OBJECT

[76] Inventor: John Washecka, 8915 Fairway Hill, Austin, Tex. 78750

[21] Appl. No.: 09/080,076

[22] Filed: May 15, 1998

[51] Int. Cl.[7] ................................................. A01K 97/14
[52] U.S. Cl. ......................... 43/5; 294/19.1; 114/221 R; 119/807
[58] Field of Search ........................ 43/5, 87; 114/221 R; 119/801, 803, 807; 294/19.1

[56] References Cited

U.S. PATENT DOCUMENTS

| | | | |
|---|---|---|---|
| 1,054,044 | 2/1913 | Shindoll | 119/208 |
| 1,713,624 | 5/1929 | Reeves | 119/153 |
| 1,830,208 | 11/1931 | Norling | 294/19.1 |
| 2,522,454 | 9/1950 | Lewry | 294/19.1 |
| 2,704,052 | 3/1955 | Wood | 119/153 |
| 3,540,769 | 11/1970 | Rosser | 43/6 |
| 3,677,597 | 7/1972 | Stipek | 294/19.1 |
| 3,765,119 | 10/1973 | Hare | 43/87 |
| 3,841,685 | 10/1974 | Kolodziej | 294/19.1 |
| 3,949,514 | 4/1976 | Ramsey | 43/87 |
| 4,513,527 | 4/1985 | Wicklund | 43/87 |
| 4,758,035 | 7/1988 | Shimanski | 294/19.1 |
| 5,058,306 | 10/1991 | Sienel | 43/5 |
| 5,082,318 | 1/1992 | Held | 294/19.1 |
| 5,538,302 | 7/1996 | Travis | 294/24 |

*Primary Examiner*—Kurt Rowan

[57] ABSTRACT

The present invention relates to an improved restraining device for more effectively gripping and handling objects and which is composed of a line or similar limber material which is formed by this device into a slidable loop about that target. The invention is composed of a generally cylindrical elongated tubular shaft and a pair of complementary arcuate jaws at the distal end which form a relatively U-shape in the open position. A releasable rope attached to a swivel snap latch is held at the distal end of the pivotal arcuate jaw. Attached to the distal end of the fixed arcuate jaw is a pair of parallel finger like appendages. In the operation mode the pivotal arcuate jaw with the swivel snap latch sandwiches between the two finger like appendages and physically holds the target. In the closing process the swivel snap latch engages the rope held between the two fingers and forms a slidable loop or a completed circle. While the fish is being held between the fixed and pivotal jaws the operator pulls the rope tightening the slidable loop around the fish's tail. The tightening of the rope frees the rope from the line holding clips and the swivel snap latch from the pivotal jaw. The operator releases the triggering device and a compression spring returns the pivotal jaw back to the invention's open position. The invention can now be removed from the water.

1 Claim, 7 Drawing Sheets

Fig. B.

TAIL HOOK A DEVICE FOR FORMING A SLIDABLE LOOP AROUND AN OBJECT

BACKGROUND OF THE INVENTION

| U.S. Pat. Documents | | | |
| --- | --- | --- | --- |
| 2616123 | Armstrong | 11/4/1952 | 17-11 |
| 2704052 | Wood | 3/15/1955 | 119/153 |
| 3540769 | Rosser | 4/26/68 | 294/19 |
| 4754569 | Fish Retrieving Apparatus | | |
| 4739573 | Releasable Fish Gaff | | |
| 5009181 | Upchurch | 4/23/1991 | 114/230 |
| 5058306 | Sienel | 10/22/1991 | 43/5 |
| 5119585 | Device for roping fish | | |

There is a need for an easy-to-use apparatus to assist fisherman and others in forming a slidable loop around fish and other objects. Such a device should be easy to use and permit the quick and easy forming of the loop around the target. The device should be disconnectable from the rope so that the apparatus does not interfere with the landing of the fish.

Known devices for placing a line around an object and capturing fish and wildlife include nets, gaffs, and snares.

Nets are an effective means of capturing fish and animals without harming the target. One serious problem with the use of nets is that the net has to be physically larger than the subject and has to be handled in such a fashion as to allow the net to surround the object. For large fish and many types of wildlife this is not always possible.

Snares are also effective in capturing and controlling fish and wildlife without harming them. The current art requires a completed loop to surround the target. The loop must therefore be larger than the circumference of the object. This presents problems when the object is large or has a long tail or the target is in a position where the operator can not physically surround the target.

This problem was partially solved by the use of a two part jaw, but even this had and still has significant problems. The two part jaws in U.S. Pat No. 5,058,306 issued to Hans N. Sienel on Oct. 22, 1991 requires the target to impact the hinge (or triggering device) with sufficient force to cause the two jaws to close.

One serious problem with this prior art is that the target fish activates the device by being impacted or hitting a hinge. When touched the target fish may exert an extra "last ditch" effort to escape before the prior art can be complete its operation. This additional effort will cause substantial strain and may break any lines or pull any fishing hooks holding the target. This may be the cause of the heart breaking story relating to the fisherman who has fought long and hard to bring the fish along the side of the boat only to lose him because the fishing line broke before the fish could be boated.

Another problem with prior art is that springs are an intricate component to the closing of the jaws. These springs may have uneven tension or not even enough tension to close the jaws. The problem of spring tension is further exacerbated when fish of different sizes are caught. Thus a small fish would ideally require a compression bias that is very weak to trigger the prior art's spring while this same spring tension might prematurely activate the triggering devise with the simple swirling of waters surrounding a large fish.

In addition to the problem of various compression biases to close the jaws, this prior art requires the physical hitting of the target fish. If the user applies too much force in hitting the target, the target may be injured and or even pushed out of the grips of the jaws.

Another problem with the prior art is that a ring is used to complete the loop.

GAFF because of the limitations listed and enumerated above, many fisherman continue to use a gaff to capture and remove their fish from the water. By design the gaff punctures and embeds itself in the fish. As can be expected, many fish violently twist and turn after being pierced by the gaff.

One serious problem with the use of a gaff is that fisherman using gaffs have been hurt trying to boat their capture. Even one experienced in the use of the gaff can be harmed when the fish turns and twists after being gaffed. Thus there is a potential for the fisherman to require medical attention when an unexpected force pulls the gaff from the fisherman's grip. In the simplest case the injury to the fisherman is merely a matter of a pulled arm. However the danger become more serious when the uncontrolled shaft hits those near it.

Another danger to those on the boat is the sharp point on the gaff. It may cause injury to fisherman even when the gaff is stored and not being used. The fisherman walks near the gaff, the boat unexpectedly moves and the fisherman comes into contact with the point of the gaff. Thus a gaff is just as dangerous to the fisherman even when not being used.

In addition to a fisherman getting physically hurt, the fish's final twisting and turning may result in the gaff being bent, broken, or even yanked out of the hands of the user and lost overboard.

In the interests of good conservation, regulatory agencies have legally established minimum size limits on certain species of fish. Additionally certain fisherman observe self imposed conservation efforts and want to return their catch unharmed to the water. In both cases the goal is to release these illegal or unwanted fish unharmed. This is impossible to achieve when using a gaff because the gaff has punctured and injured the fish. While the goal of releasing the fish is noble, expecting the wounded illegal fish to survive and grow to a legal size is nothing more than day dreaming. The wounding of these fish is a needless waste of a limited resource and is avoidable with the use of this invention.

One problem that every fisherman wants is to catch a trophy size fish. The lucky fisherman may want to enter this fish in a contest. When a gaff punctures the fish's skin there will be a loss of blood. And while this loss may appear to be minimal there is a possibility that in a contest this loss may be the difference between a wining fish and the second best fish.

When the gaff punctures the fish's skin, the damage to the skin makes it much harder for the taxidermist to make an accurate replica of the living fish for future display Lastly the flesh around the puncture wound caused by the gaff is almost impossible for human consumption.

One problem that was not solved with the use of a gaff is that the skin on some fish, such as sharks, is so hard to penetrate that even the sharpest of gaffs will not penetrate it. For these fish the gaff doesn't work at all and some other means must be used to boat the fish.

Thus the problem of landing fish without injury to the fish or fisherman has not been solved. As such there is a continuing need for new and improved fish handling device which can be easily utilized by the fisherman without danger of the tool being broken, distorted or lost, is safe to the fisherman, and can be used without damage to the fish. The present invention substantially fulfills this need.

BRIEF SUMMARY OF THE INVENTION

It is the object of this invention to provide an apparatus for: 1) controlling the targeted object which may be a fish, 2) preventing the harming or puncturing the body of the captured fish, 3) provide additional safety for the fisherman by allowing other fishermen to join together in bringing the fish on board and 4) avoiding the disbursing of blood in the water that acts as an attractant to predator fish which will attack the target fish and is a common occurrence with the use of a gaff that punctures the fish's skin and causes bleeding. The difference between this invention and prior art are substantial and nonobvious.

Accordingly, besides the objects and advantages of the apparatus described in my above patent, one objective and advantage of the present invention is to provide a means of capturing fish and wildlife without causing harm to the captured. The present invention is a device for fastening a slidable rope around the tail of a fish or other object and at the same time is a tool for more effectively gripping and handing that fish without injury to either the fish or the operator. Such an apparatus overcomes the above mentioned problems with prior art.

In the preferred embodiment of the invention, the apparatus includes an elongated shaft with two arcuate members or a pair of complementary arcuate jaws connected to one end of a shaft. In this embodiment of the invention the first jaw is fixed or rigidly attached to the distal end portion of the shaft, while the second jaw is pivotally attached to the fixed jaw in such a fashion that the pivotal jaw can pivot relative to the fixed jaw. In the open position to two jaws form a relative U-shape which the operator places around the target area.

In the preferred embodiment the pivotal jaw is closed with a wire cable attached to the pivotal jaw and the triggering devise. The operator controls the closing of this apparatus allowing the opportunity to adjust the position of the invention in relation to the target at all times. This is not possible with prior art. Thus a novel and nonobvious feature of this invention is that the operator can reposition the invention and continue making adjustments relative to the position of the fish until the fish is firmly controlled.

Another feature of this invention is that the operator forces the two jaws to close until they meet the resistance of the target. The pressure exerted between the sandwiching of the fixed and pivotal jaws holds that target in position until the operation has been completed and the rope firmly attached to the fish. Thus another new and novel aspect of this inventions is that the invention holds the target in place preventing an escape while the slidable loop is being formed.

In the preferred embodiment of this invention a channel notch with a dimension a little smaller than the width of a swivel snap latch has been cut into the distal end of the pivotal member. A swivel snap latch is placed within this notch and is thus releasable held by the pressure exerted by the two parallel sides of the notch against the width of the swivel snap latch.

In the preferred embodiment one end of a rope is attached to a swivel snap latch. The rope then follows the contours of the relative U-shape of the fixed and pivotal jaws and is further releasably held in that shape by means of line holding clips which are spaced apart by the predetermined distance.

The line holding clip is a cylindrical support with a bifurcated flange at the distal end and a series of bulb shaped pins at the proximal end. The bifurcated flange is sized to hold a specific size of rope. Thus there will be one size flange for ¼ inch rope and another size for ½ inch rope.

The first bulb shaped pin is inserted within a corresponding recess in the apparatus. The pressure between the first and second bulb shaped pins keep the line holding device in place on the invention. The bulb shaped pins are a standard size allowing the operator to easily change the line holding device and thus the size of the rope to be used. Thus another new and novel feature of this invention is that the operator can easily change the size of the rope to be to match the size and strength of the object being captured.

In the preferred embodiment of this invention a pair of parallel finger appendages are attached to the distal end of the fixed jaw. The rope is held across the tips of the parallel fingers by the line holding clips and the pressure exerted by them. The swivel snap latch attached to the distal free end of pivotal jaw comes into contact with the rope held between the two fingers. The resistance of the line held between the two fingers opens the swivel snap latch completing the contract and forming a slidable loop around the target. Thus the current invention eliminates the need for a ring which is a requirement of the prior art and uses the rope itself to complete the slidable loop. Thus another new and novel feature of this invention is that a slidable loop has been formed without the use of additional parts.

In the preferred embodiment of this invention the operator controls the closing and forming of a slidable loop. Whereas springs are an integral part of prior art. If any spring failed to operate as specified, the prior art wouldn't work at all. In the preferred embodiment of this invention a spring is used merely as a conveyance to return the apparatus to the open state. In the improbable event of spring failure, this invention would still work as the weight of the fish would open the pivotal jaw which would not be possible with prior art.

There are conditions where the fisherman wants to control the fish but not bring him onboard. Some fish are dangerous such as one that has not worn itself out and is commonly referred to as a green fish while other fish have natural weapons such as teeth and abrasive skin. When a gaff is used to control the fish, the fish can only be held on the side of the boat for a short time as the fish's bleeding will be an attractant to predator fish. The current invention solves this problem because the dangerous fish can be secured to the side of the boat until it has expired and can be brought safely on board.

Thus an important object of the present invention is to provide an apparatus which is adapted to pass a line or the like around the tail of a fish and which may be manipulated from a point distantly removed from the fish and which after passing the line around the fish may be readily detached from the line, thus leaving the line in position on the fish and in control of that fish. As the fish is being restrained by the fixed and pivotal jaws the operator pulls on the rope tightening the slidable noose around the target. As the noose is being tightened the rope is being pulled from the line holding clips. When the rope is tight, the operator releases the trigger, engaging a spring which causes the pivotal jaw to return to its original open position. This allows the loop to assume a closed position around the object uninhibited by the apparatus. The devise can now be removed from the water.

The rope allows the fisherman to control the fish without injury, alongside the boat. The user could then determine the weight of the fish without having to bring the fish on board. If the fish does not meet the fisherman's criteria the fish could be released without having been touched by human hands. The fact that the fish does not have to be touched by human hands is important to the fish's survival because each time the fish is touched certain slimes are removed from the fish's body. Thus the fish could be tagged and released or brought onboard. This is not possible in prior art.

Thus this invention solves a number of problems in that: slidable loop can be formed and placed around a fish or object, the target of fish can be controlled without injuring that fish, That there are no sharp points to injure the fisherman.

Thus the reader will see that the tail hook of the invention provides a highly reliable, lightweight, yet economical device that can be used by persons of any age with minimal training. While my above descriptions contain many specificities, these should not be construed as limitations on the scope of the invention, but rather as an exemplifications of one preferred embodiment thereof. Many other variations are possible. Accordingly, the scope of the invention should be determined not by the embodiment illustrated, but by the appended claims and legal equivalents.

There has thus been outlined, rather broadly, the more important features of the present invention in order that the more detailed descriptions thereof that follow may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing other structures, methods and systems for carrying out the several purposes of the present invention. It is important, therefore, that the claims be regarded as including such equivalent constructions so far as they do not depart from the spirit and scope of the present invention.

Further objects and advantages of my invention will become apparent from a consideration of the drawings and ensuing descriptions.

DETAILED DESCRIPTION OF THE INVENTION

Figure 1:
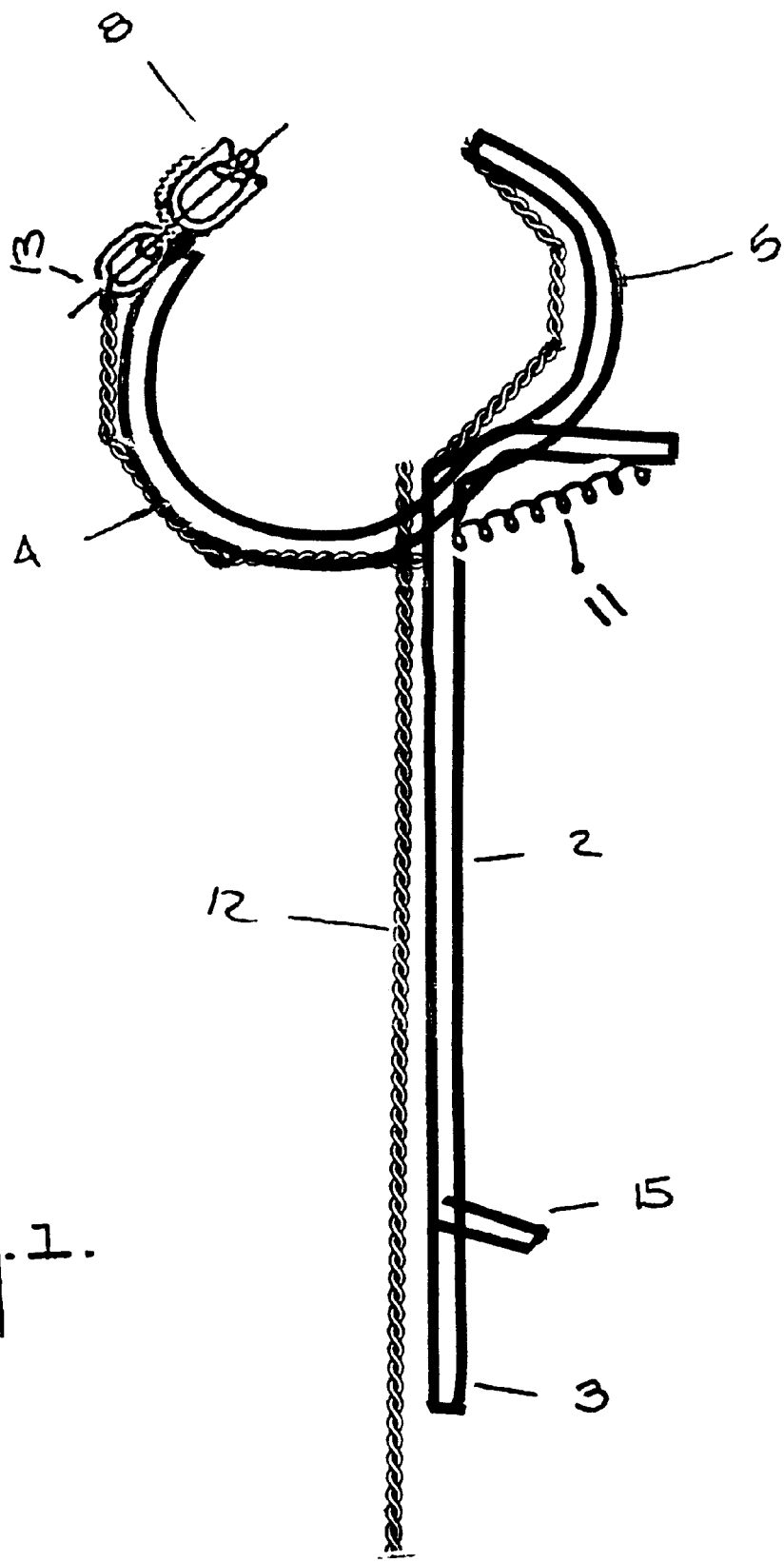
FIG. 1 is a perspective view of the apparatus embodying the present invention, showing the apparatus in the open position.

As shown in the drawings for purposes of illustration, the present invention is embodied in an apparatus, indicated generally by reference number (1), to assist the user in forming a slidable loop around a fish or other object. The apparatus (1) may be efficiently gripped, moved, supported, and executed by a single hand. As will be described in more detail below, the device 1 can be grasped by the operator to assist in forming a slidable loop around the tail of a fish without leaving the boat and while the boat is some distance from the fish.

The apparatus 1 includes a rope 12, and a shaft 2, having a proximal end portion for grasping by the user with a pair of complementary arcuate jaws 4, 5 attached to the distal end portion of said shaft 2. The first of the complementary arcuate jaws 4 is pivotal and separately movable and pivotally attached to the second fixed complementary arcuate jaw 5 in such a fashion that when the fixed and pivotal jaws 4,5 are in the open position, the upper ends thereof are not in abutting relationship, but are separated by a gap or space.

The rope 12 has a first end portion 13 attachable to the boat or held by the operator and a second end portion 14 which will be formed into a slidable loop by this invention, and a length of line extending between the first and second end portions 13, 14 respectively.

In a first embodiment of the invention, as can be seen in FIG. 1, FIG. 2, FIG. 3 and FIG. 4 the apparatus includes said shaft 2 which is an elongated first member which may be tubular and is preferably constructed from light metal tubing, such as aluminum tubing. However, other lightweight materials, such as fiberglass, for example, may be used. Said handle 3 is attached to the proximal end portion of said shaft 2 and is constructed of resilient material such as rubber, foam plastic or the like and secured to the said shaft 2 by any suitable bonding techniques.

Said fixed jaw 5 is rigidly attached to the apparatus 1 at the distal end portion of said shaft 2 in some conventional means such as welding, threaded attachment members, or the like. Said pivotal jaw 4 is connected to the fixed jaw 5 in such a fashion that said pivotal jaw 4 can pivot relative to said fixed jaw 5 and may be pivotally connected to the base portion of the fixed jaw 5 by means of a suitable nut and bolt, a rivet or other such means.

As shown in FIG. 1, the open position of this apparatus, the free distal ends of the fixed and pivotal jaws 4, 5 respectively are spaced apart by a predetermined distance. In the open position FIG. 1 the fixed and pivotal jaws 4, 5 form a pair of upwardly extending complementary arcuate jaws 4,5 in a relatively U-shape. In this manner, the fixed and pivotal jaws 4,5 respectively hold the rope in the open position.

Figure 3:
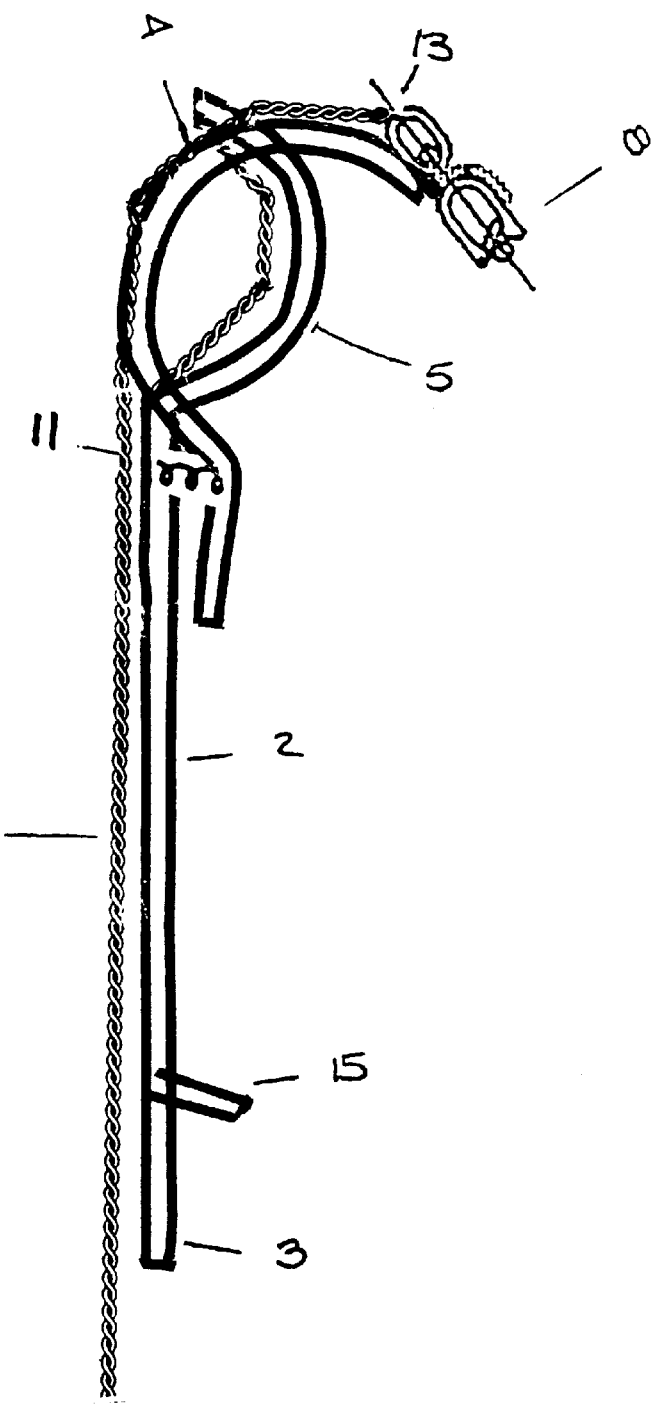
FIG. 3 is a perspective view of the apparatus embodying the present invention, showing the apparatus in the closed position.
Figure 4:
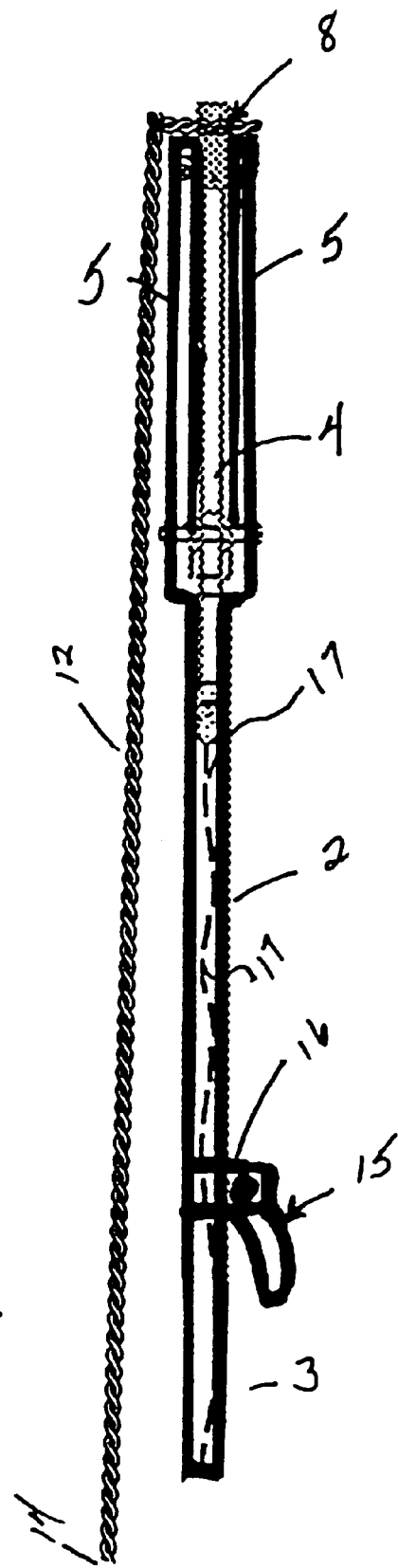
FIG. 4 is an elevational cross section of the apparatus.

As shown in FIG. 3 the fixed and pivotal jaws 4, 5 have a closed position relative to one another. In the closed position shown in FIG. 3 the fixed and pivotal jaws 4,5 are in a relatively circle shape surrounding the target.

Figure 2:
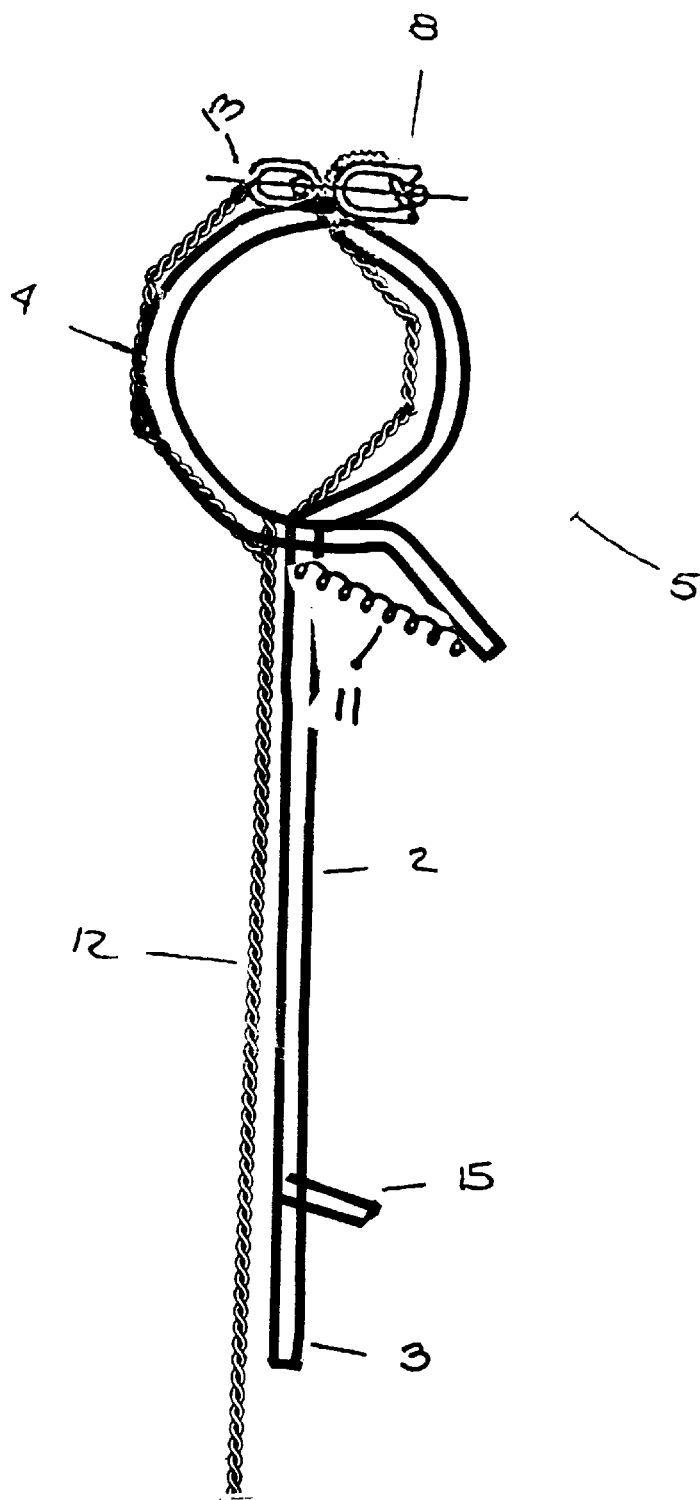
FIG. 2 is a perspective view of the apparatus embodying the present invention, showing the apparatus in the snapping or engagement position.

As shown in FIG. 1, FIG. 2 and FIG. 3 one end 13 of the rope 12 is fastened to the base end 9 of the swivel snap latch 8 which is releasably held in the terminal distal end of said pivotal jaw 4. Said swivel snap latch 8 has a lever member 10 which pivots at the base 9 of said swivel snap latch 8 so as to open or close said swivel snap latch 8.

Figure 6:
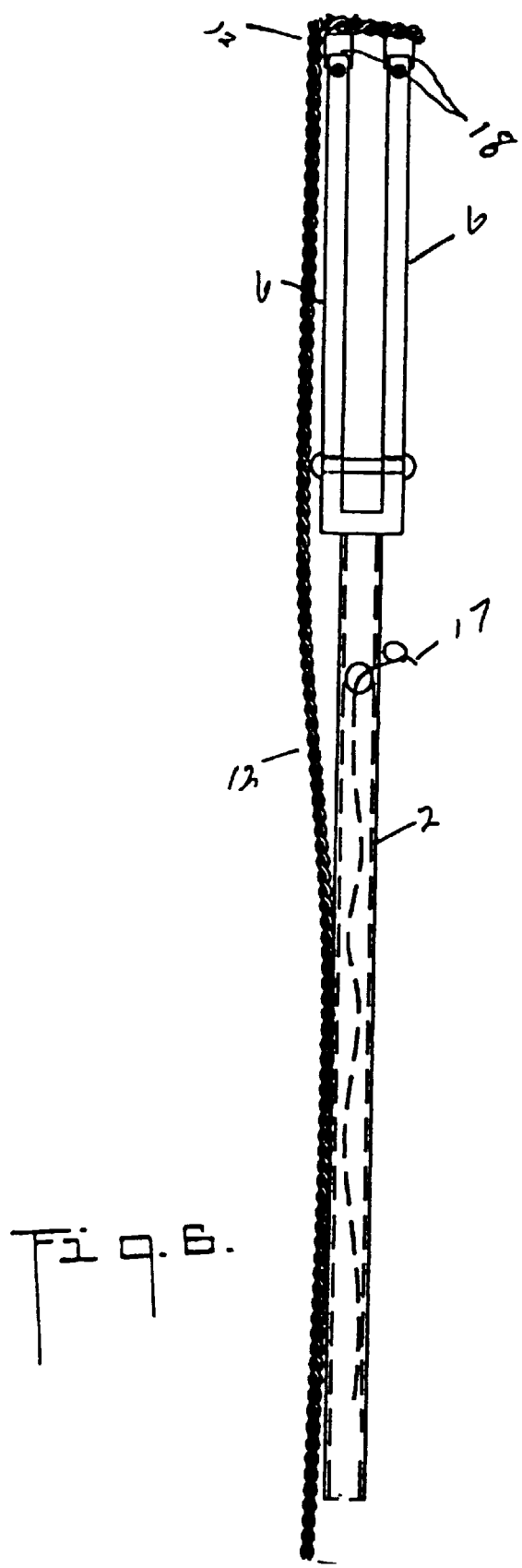
FIG. 6 is a perspective view of the fingers at tip of second arcuate member
Figure 7:
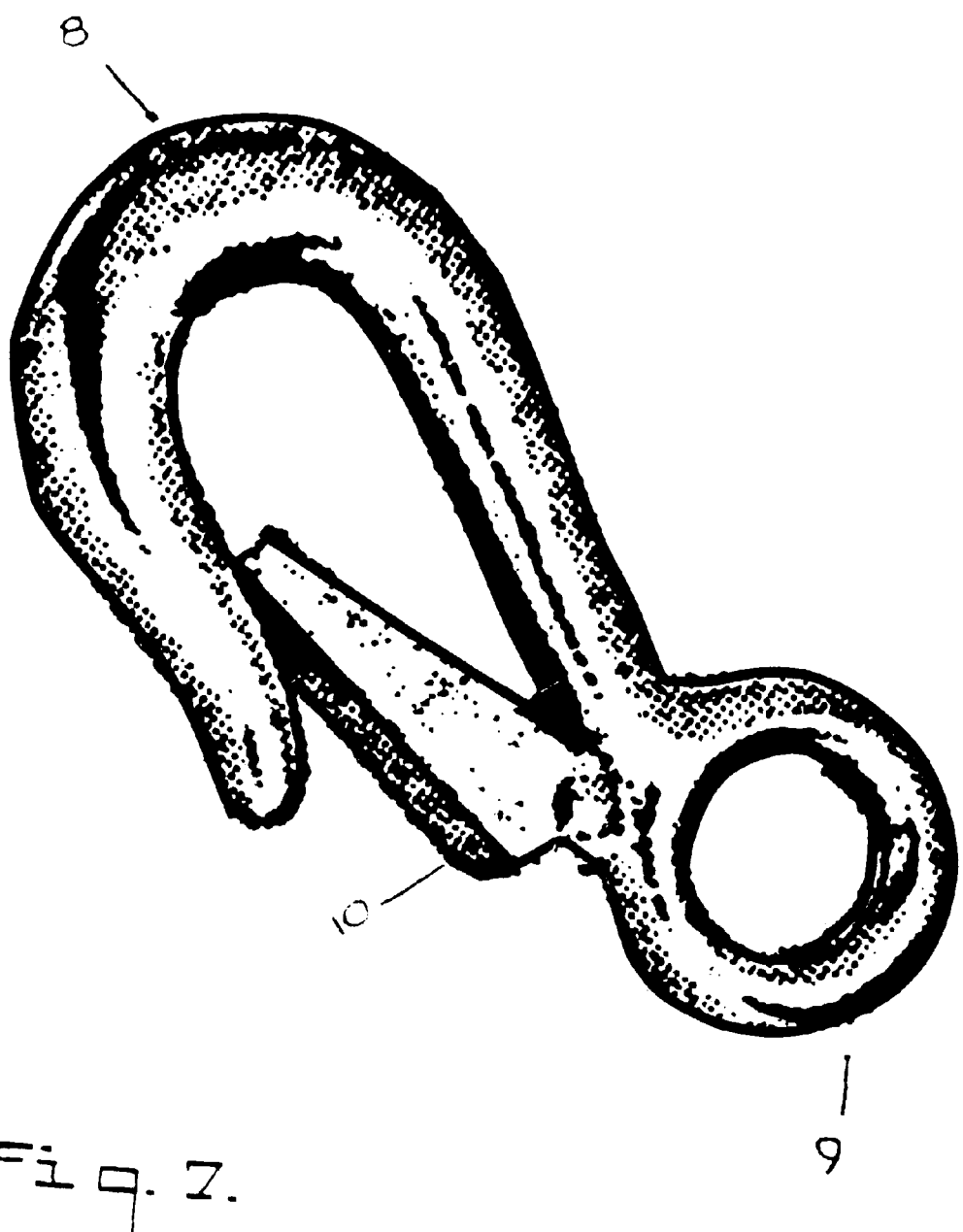
FIG. 7 is a perspective view swivel snap latch

As shown in FIG. 6 said fixed jaw 5 has a pair of substantially parallel, spaced-apart, arcuate fingers 6, 7 rigidly attached to its proximal end. Each of the fingers 6, 7 has a free or distal end portion. Said fingers 6,7 are substantially parallel, spaced-apart by a lateral distance along their full length and are sized and spaced apart so that they form a recess with sufficient clearance to allow said flexible jaw 4 together with said swivel snap latch 8 to freely pass between and sandwich between both fingers 6,7 forming the closed position of said invention FIG. 3.

Figure 5:
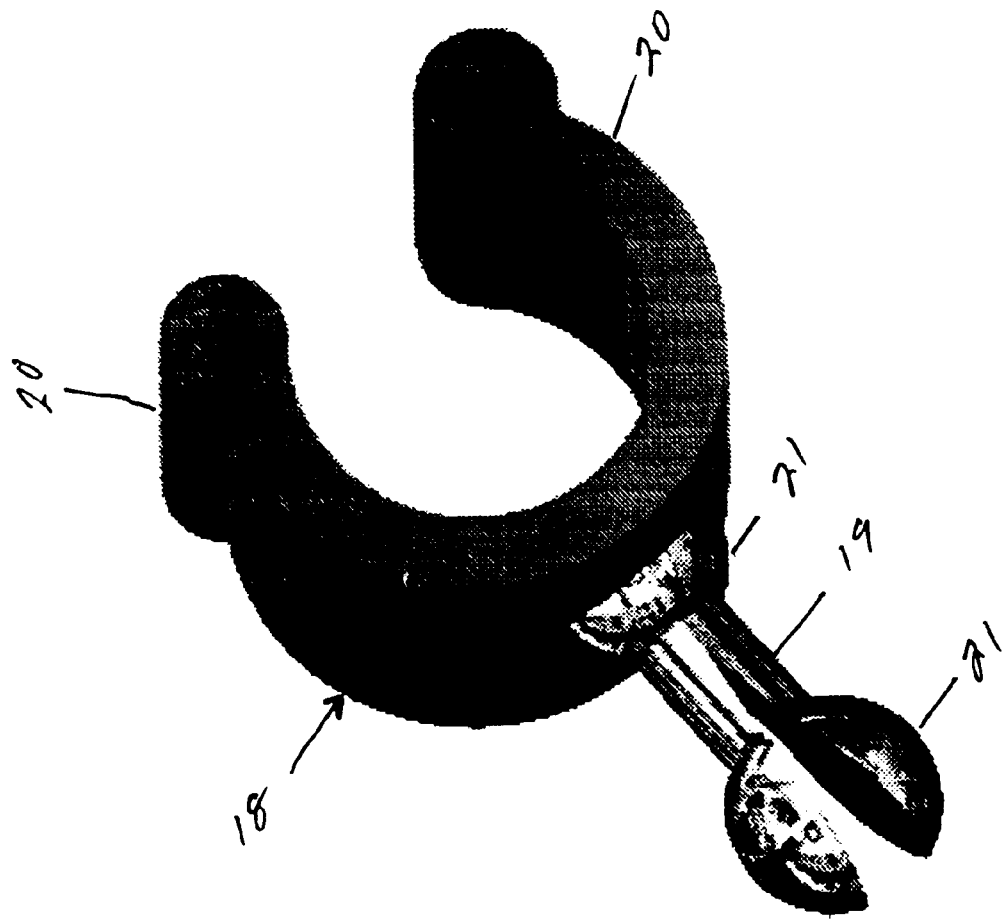
FIG. 5 is a perspective view of the line-retaining clip

A further noteworthy feature of the apparatus 1 is that said rope 12 is releasably held to the apparatus 1 by means of line-retaining clips 18 which have a bifurcated upper end portions 20 attached to a stem 21 and are designed to hold a predetermined size of rope. As shown in FIG. 5 the base 19 of the line-retaining clip 18 is sized to fit into a pre-drilled hole in this apparatus 1. In the preferred embodiment of the invention the operator can easily change the size of the rope 12 used to encircle the fish by removing the rope 12 and the line-retaining clips 18 for the unwanted sized rope 12 and replacing them with rope 12 and line-retaining clips 18 designed for the desired sized rope 12. Thus the apparatus 1 can substantially hold any size of rope 12 in place so that it may be formed into a slidable loop around an object.

As can be seen in FIG. 1. FIG. 2 and FIG. 3 the rope 12 is attached to said swivel snap latch 8. The rope 12 then is releasably held by line-retaining clips 18 strategically placed and substantially following the contours of said flexible and fixed jaws 4, 5. The rope 12 crosses the open span between the pair of fingers 6,7 and then returns down the side of one of the pair of fingers 6,7 along the side of the shaft 2 to the handle 3 and finally to the operator.

In the preferred embodiment of this invention a compression spring 11 is used as the biasing power to keep the invention in the open position and is mounted between the pivotal jaw 4 and said fixed jaw 5 and normally urges or biases said pivotal jaw 4 telescopically away from said fixed jaw 5 into the open position wherein the fixed jaw 5 and the pivotal jaw 4 form a relatively U-shape. A triggering devise 15 compresses the spring 11 moving the pivotal jaw 4 in opposition to the force of the spring 11 and holds the pivotal and fixed jaws 4,5 respectively in the closed position until the triggering devise 15 is released. Thus the apparatus is in the closed or operative position.

The operator, while located a distance from the target and holding the proximal end of the shaft 2 can easily place the U-shaped jaws 4,5 around the target. The operator selectively places the devise in its operative position by pulling on a triggering devise 15 causing said pivotal jaw 4 to pivot. The swivel snap latch 8 engages the rope 12 shown in FIG. 2 and forms the contract creating the slidable loop. As shown in FIG. 3 said flexible jaw 4 comes to rest and sandwiches between said fingers 6,7. Thus the pivotal and fixed jaws 4, 5 close until they physically restrain the object or fish. Thus the fish is held in place by the pressure between the pivotal and fixed jaws 4,5.

In the preferred embodiment of the invention the triggering devise 15 is mounted on a pin between parallel ear portions of a circular clamp 16 which encircles and is secured to said shaft 2 adjacent to the handle 3. One end of a wire cable 17 is attached to said triggering devise 15 and the other end of said wire cable 17 is attached to the pivotal jaw 4. In the preferred embodiment of the invention the wire cable 17 is run between these two points within the shaft As is readily seen, when the triggering devise 15 is pulled, the wire cable 17 is tightened causing the pivotal jaw 4 to pivot towards the shaft 2 thus changing the relatively U-shape of this invention to a relatively circle shape as shown in FIG. 2 and FIG. 3.

As seen in FIG. 2 when the pivotal jaw 4 closes, the swivel snap latch 8 comes in contact with said rope 12 which is being held horizontally on the open span between said fingers 6,7. The resistance of meeting this rope 12 causes the lever 10 on the swivel snap latch 8 to open. The rope 12 enters the swivel snap latch 8. Once the rope 12 enters the swivel snap latch 8 the pressure upon the lever 10 is released and the lever 10 closes, preventing the rope 12 from being released from the swivel snap latch 8. Thus a slidable loop has been formed encircling the target fish.

While the fish is being held between the pivotal and fixed jaws 4,5 the operator pulls on the rope 12 tightening the loop. The tightening causes the rope to be released from the line-retaining clips 18. The rope 12 now assumes a closed position around the target uninhibited by either the pivotal or fixed jaws 4, 5 and in a relatively circle shape surrounding the target. Once the rope 12 is tightened around the target the operator can release the trigger 15 and remove this apparatus 1 from the water.

In the preferred embodiment the shaft 2 can be broken down for storage or extension by means of an insert (not shown) which can be snapped into place within a recess (not shown) in the shaft distal end portion and selectively removed in a conventional manner when the user decides to break the shaft 2 down.

With the present invention, the operator can quickly and more reliably, in a safer manner, and with less effort form a slidable loop around an object while at a distance from said object. The operation of the apparatus (1) is simple and requires no training or special skills. Further the apparatus (1) of the present invention has an uncomplicated construction and can be manufactured in an economical manner. The apparatus 1 can be broken down for easy storage. The utilitarian features of the resulting device will be substantially as described and shown herein. It will be appreciated that, although a specific embodiment of the invention has been described herein for purposes of illustration, various modification may be made without departing from the spirit and scope of the invention. Accordingly, the invention is not to be limited except as described by the appended claims.

What is claimed as new is the following:

1. A fish retrieving apparatus for removing fish from water by forming a slidable loop comprising, a longitudinal extending shaft, a handle mounted on a proximal end of said shaft, a first curved jaw pivotally mounted on a distal end of said shaft, a second curved jaw rigidly attached to a distal end of said shaft, each jaw is comprised of a pair of substantially parallel spaced apart curved fingers, a snap swivel latch, a rope with one end mounted to said swivel snap latch, said snap swivel latch releasable mounted on an end of said first jaw, a trigger mounted on said shaft, line retaining clips mounted on an end of said curved fingers of said second jaw and along said first and second jaws, a mid point of said rope retained in said line retaining clips of said second jaw and said rope is also retained in said retaining clips along said first and second jaws such that said rope follows a contour of said first and second jaws, said trigger connected to said pivotal jaw by a cable mounted in said shaft, a compression spring mounted at said distal end of said shaft to bias said first jaw in an open position, whereby operating the trigger causes said cable to pivot said first jaw toward said second jaw in opposition to said compression spring and said snap swivel latch engages said rope mounted between said curved fingers of said second jaw on said line retaining clips to form a slidable loop in said rope such that an operator pulling on a second end of said rope releases the rope from said line retaining clips so that a fish caught in the slidable loop can be removed from the water.

* * * * *